(12) United States Patent  
Muhlestein (10) Patent No.: US 6,968,345 B1  
(45) Date of Patent: Nov. 22, 2005

(54) TECHNIQUE TO ENABLE SUPPORT FOR SYMBOLIC LINK ACCESS BY WINDOWS CLIENTS

(75) Inventor: Mark Muhlestein, Tuscon, AZ (US)

(73) Assignee: Network Appliance, Inc., Sunnyvale, CA (US)

( * ) Notice: Subject to any disclaimer, the term of this patent is extended or adjusted under 35 U.S.C. 154(b) by 795 days.

(21) Appl. No.: 10/083,828

(22) Filed: Feb. 27, 2002

(51) Int. Cl.$^7$ .............................................. G06F 17/30
(52) U.S. Cl. ................. 707/103 R; 707/10; 707/104.1; 709/220; 709/232; 715/501; 715/514
(58) Field of Search .............................. 707/10, 103 R, 707/104.1; 709/220, 232; 715/501, 514

(56) References Cited

U.S. PATENT DOCUMENTS

| | | | |
|---|---|---|---|
| 5,163,131 A * | 11/1992 | Row et al. .................... | 709/202 |
| 5,355,453 A * | 10/1994 | Row et al. .................... | 709/219 |
| 5,485,579 A * | 1/1996 | Hitz et al. .................... | 709/221 |
| 5,701,462 A | 12/1997 | Whitney et al. | |
| 5,802,366 A * | 9/1998 | Row et al. .................... | 709/250 |
| 5,819,292 A | 10/1998 | Hitz et al. | |
| 5,842,214 A | 11/1998 | Whitney et al. | |
| 5,931,918 A * | 8/1999 | Row et al. .................... | 719/321 |
| 5,941,972 A | 8/1999 | Hoese et al. | |
| 5,963,962 A | 10/1999 | Hitz et al. | |
| 6,038,570 A | 3/2000 | Hitz et al. | |
| 6,065,037 A * | 5/2000 | Hitz et al. .................... | 709/200 |
| 6,119,151 A * | 9/2000 | Cantrell et al. ............ | 709/216 |
| 6,144,999 A * | 11/2000 | Khalidi et al. .............. | 709/219 |
| 6,163,856 A * | 12/2000 | Dion et al. .................... | 714/4 |
| 6,185,615 B1 * | 2/2001 | Labiaga et al. ............. | 709/224 |
| 6,356,863 B1 * | 3/2002 | Sayle .......................... | 703/27 |
| 6,425,035 B2 | 7/2002 | Hoese et al. | |
| 6,671,773 B2 * | 12/2003 | Kazar et al. ................. | 711/112 |
| 6,718,372 B1 * | 4/2004 | Bober ......................... | 709/217 |

OTHER PUBLICATIONS

Widelink NR4-IS NR4-IS/PR ISDN Router User's Guide, 1998, pp. 1-128.*
David Hitz et al. TR3002 File System Design for a NPS File Server Appliance published by Network Appliance, Inc.
Common Internet File System (CIFS) Version: CIPS-spec 0.9, Storage Networking Industry Association (SNIA), Draft SNIA CIFS Documentation Work Group Work-in-Progress, Revision Date: Mar. 26, 2001.
Fielding et al. (1999) Request for Comments (RFC) 2616, HTTP/1.1.

* cited by examiner

Primary Examiner—Frantz Coby
(74) Attorney, Agent, or Firm—Cesari and McKenna, LLP (57) ABSTRACT

A widelink directive provides an enhanced level of indirection with respect to a resource, such as a unit of storage, attached to a destination, such as a storage system. The widelink has a scope of indirection that is "wider" than a conventional symbolic link ("symlink"). The novel widelink directive is similar to the distributed file system (DFS) facility that allows DFS-enabled common internet file system clients to resolve uniform naming convention paths to locations that may or may not be on an original storage system, such as a multi-protocol filer, or original protocol server of the filer. By taking advantage of clients that support the DFS facility, the widelink directive is quite flexible in that it can be used to resolve symlinks that "leave" a share.

25 Claims, 4 Drawing Sheets

TECHNIQUE TO ENABLE SUPPORT FOR SYMBOLIC LINK ACCESS BY WINDOWS CLIENTS

FIELD OF THE INVENTION

The present invention relates to storage systems and, more specifically, to a technique for providing an enhanced level of indirection to a resource attached to a destination, such as a storage system, file server or filer.

BACKGROUND OF THE INVENTION

A file server is a computer that provides file service relating to the organization of information on storage devices, such as memories, tapes or disks. The file server or filer may be embodied as a storage system including a multi-protocol storage operating system that implements a file system to logically organize the information as a hierarchical structure of directories and files on, e.g., the disks. Each "on-disk" file may be implemented as set of data structures, e.g., disk blocks, configured to store information, such as the actual data for the file. A directory, on the other hand, may be implemented as a specially formatted file in which information about other files and directories are stored.

A storage system may be further configured to operate according to a client/server model of information delivery to thereby allow many clients to access services provided by a filer. A protocol server is an example of an application service provided to a client. The client may comprise an application executing on a computer that "connects" to the filer over a computer network, such as a point-to-point link, shared local area network, wide area network or virtual private network implemented over a public network, such as the Internet. Each client may request the services of the file system on the filer by issuing file system protocol messages (in the form of packets) to the filer over the network. An example of such as service is a request to access a unit of storage, such as a directory. It should be noted, however, that the filer may alternatively be configured to operate as an assembly of storage devices that is directly-attached to a (e.g., client or "host") computer. Here, a user may request the services of the file system to access (i.e., read and/or write) data from/to the storage devices.

Clients often employ a multi-protocol environment to access the various services and/or resources on a filer. For example, some users of a client might use, e.g., Unix® computer platforms while others may use Windows™ platforms, to access a resource, such as a unit of storage, on the filer. An aspect of Windows networking is the notion of a uniform naming convention (UNC) path that defines a way for a user to refer to the unit of storage on a filer or server. A UNC path is prefixed with the string \\ to indicate resource names on a network. For instance, a UNC path may comprise a server name, a share name and a path name that collectively reference a unit of storage, such as a file or directory. A share is a shared storage resource, such as a directory, which is exported by a Windows server for use by a client. Each share has a property that specifies which users and groups are allowed to access the share, and the type of access allowed, e.g. read or write access. This property of a share thus enables share-level control or security.

A symbolic link ("symlink") is a Unix structure that introduces a level of indirection with respect to a resource, such as a unit of storage. Instead of representing a name of a file or directory on a Unix platform, the symlink provides a path descriptor to that unit of storage. Symlinks are useful because of the flexibility they provide with respect to the locations of units of storage on a server. In other words, a user can be informed that the user's data is provided at a location specified by a symlink and an administrator, when reconfiguring the location of that data, may easily change the content (path descriptor) for that symlink. Symlinks are particularly useful in the case of conventional network file system (NFS) mount operations where a file system can be "grafted" into a directory to establish a mount point. The actual layout of a NFS file system for a Unix operating system is a function of data stored on a disk (in file structures) combined with the manner in which the disks are mounted.

For example, assume a NFS file system is organized on a Unix server such that a directory /foo has a subdirectory /bar2 included therein. A new directory structure is mounted "on top of" the directory /bar2, where the new structure includes a plurality of files (x) and a plurality of subdirectories (f, g). Assume also that a Unix client transmits a request that includes a symlink sss to the server, wherein the symlink is defined as a path descriptor /foo/bar2. In response to receiving the request, the Unix server resolves the meaning of the symlink sss by substituting the path descriptor /foo/bar2 for that symlink. The NFS file system then parses the path descriptor to resolve directory /foo and subdirectory /bar2 and thereby direct the request to the appropriate unit of storage x, f or g. Thus, the symlink provides a means of introducing a level of indirection into a directory or file. However, the notion of a symlink is undefined in a Windows environment.

One approach that allows Windows users to make use of symlinks involves the use of a conventional Samba software program. Samba is an open-source Windows-compatible "server" running on a Unix operating system platform that provides symlink support by utilizing the underlying Unix operating system to resolve paths, including paths containing symlinks. However, Samba is not an ideal solution because it does not efficiently support the Windows security model. That is, any user can create a symlink to go to any path on the server running Samba, including paths that are not exported by Samba. Since this is often not desirable, an option must be set to force Samba to resolve all symlinks to ensure they do not leave the original share. Moreover, if the destination of a symlink is on a file system that is NFS-mounted on the Samba server system, all requests are directed first to the Samba server which, in turn, passes the requests to the NFS server providing the destination path. Not only does this solution double the total network traffic, but it also imposes substantial additional overhead.

Since native Windows environments do not support Unix symlinks, it is difficult for users to migrate to a multi-protocol storage system, such as a filer, if they are dependent on symlinks in their Windows environments. For example, a Windows client generally has no knowledge of how a NFS client has mounted its storage resources. Information relating to the mounting of storage resources on the filer is typically represented in a symlink file, called a symlink translations file. The symlink.translation file is preferably a text file that is converted internally to a binary image used to facilitate searching and matching on the contents of a symlink.

The symlink.translations file is typically located in the /etc/ directory of a file system implemented by the filer. The file system is organized as a hierarchy of directories starting from a single "root" directory represented by a slash (/). Immediately below the root directory are several system directories that contain information required by the operating system. One such system directory is the /etc/ directory that contains various commands and files, including the symlink.translations file, used for system administration. The symlink.translations file is preferably configured as a table in memory having a plurality of mapping entries; an example of a typical notation of a symlink mapping entry is:

map /foo/bar2/* /vol/vol2/bar2/*

When a request, such as a common internet file system (CIFS) request, is received from a Windows client having a symlink reference therein, the filer interprets that symlink request by accessing the symlink.translations file within its /etc/ directory. For example, a symlink sss is resolved by comparing the contents of that symlink (/foo/bar2) with the mapping entries of the symlink.translations table to determine whether there is a match. If a match is found, the contents of the symlink are substituted with the latter portion of the map entry (/vol/vol2/bar2) to thereby enable access to the requested unit of storage.

In general, the mapping entries of the symlink.translation table can only securely resolve path descriptors within the same share. If the filer receives a request directed to a share that includes a symlink referencing a path descriptor to a destination that is "outside" of that share, the share-level security protections can be circumvented. As noted, the destination of a symlink depends on the way an NFS client has mounted its file system. If the destination is not local to the filer, the filer would have to assume the role of an NFS client in order to reach the destination. It is undesirable and inefficient to implement an NFS client on a filer merely to solve this problem.

Windows clients typically utilize a distributed file system (DFS) feature that allows a Windows client to access a resource (e.g., a share or path) that is originally attached to a server. If the original server does not have the resource, it can optionally respond to the client with a special "error" message indicating the new location of that resource. The server can generate this special error message through use of a distributed database storing the locations of storage resources for Windows (NT) platforms. DFS thus provides a way to introduce a level of indirection for paths on a Windows platform. That is, the Windows client can request access to a resource by referencing a path descriptor that may be on a different server (destination) than that to which the requested resource was originally attached. The original server may then return an indication of the correct path to that resource.

Notably, DFS provides a secure approach to this level of indirection by, inter alia, requiring the client to establish a new connection (e.g., a conventional network session "connection" in accordance with a conventional connection-oriented network service) to the different server. For example, assume the Windows client issues the following request to an original Windows server to access a unit of storage:

dir \\server1\a

If the unit of storage is no longer at the specified location, the original server may respond with a special error status "path_not_covered". The client can then request that the original server provide the new location (destination) of the resource. The original server may then return the correct path to that resource, which may be on a different server. In response to receipt of the correct path, the client establishes a new connection to the different server, which authenticates the connection and checks all share-level access control lists.

Therefore, a feature of the present invention is to provide a technique and mechanism that enables a storage system, such as a filer, to resolve requests from clients to access resources within a multi-protocol environment.

Another feature of the present invention is to provide a technique that enables clients of various protocol environments to access file system resources on a multi-protocol filer by providing a level of indirection with respect to the locations of the resources.

Yet another feature of the present invention is to provide a mechanism that allows a Windows client to make use of a Unix-style type of symbolic link.

SUMMARY OF THE INVENTION

The present invention comprises a widelink directive that provides an enhanced level of indirection with respect to a resource, such as a unit of storage, attached to a destination, such as a storage system. Broadly stated, the widelink structure has a scope of indirection that is "wider" than a conventional symbolic link ("symlink"). The novel widelink directive is similar to the distributed file system (DFS) facility that allows DFS-enabled common internet file system (CIFS) clients to resolve uniform naming convention (UNC) paths to unit of storage locations that may or may not be on an original storage system, such as a multi-protocol filer, or original protocol server of the filer. By taking advantage of clients that support the DFS facility, the widelink directive is quite flexible in that it can be used to resolve symlinks that "leave" a share.

In the illustrative embodiment, the widelink structure is stored as a new type of entry in a conventional symlink-.translation file located in the /etc/ directory of a file system on the filer. The widelink entry has a multiple-part format, wherein a first part of the widelink entry is compared with the content of a widelink directive. If a match is found, the content of the directive is substituted with a second part of the widelink entry to enable access to the requested unit of storage.

Operationally, a filer processes a storage request including a path descriptor from the DFS-enabled CIFS client to access a storage resource attached to a remotely configured destination. In the course of processing the path descriptor, the filer encounters a symlink-type directive having the syntax of a widelink structure. For example, the symlink destination may start with the "/" character. If the widelink matches the first part of a widelink entry of the symlink.translation file, the special "path_not_covered" status is returned to the client, which then requests a DFS referral. In response to the referral request, the filer returns the correct path to the resource that is preferably the latter part of the widelink directive. The destination of the correct path could refer to any server capable of handling CIFS clients, such as another filer. The client may then establish a connection to the destination over the correct path to access the storage resource.

Advantageously, the inventive widelink directive provides full share-level security that is enforced since the client establishes a new connection to the destination. That is, once a correct path has been resolved, the client connects directly to the destination having the resource. The destination can be any CIFS share including another filer, storage system or Windows server. In addition, the destination may be a DFS root on a Windows server, which then provides a further level of indirection if desired. The novel widelink directive thus solves the problem of being able to follow a symlink created by a Unix user and referenced by a Windows client, even if the link extends beyond (goes out of) a share and onto another server or filer. If the destination of a symlink is itself another symlink, the process is completed until the final destination object is resolved.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
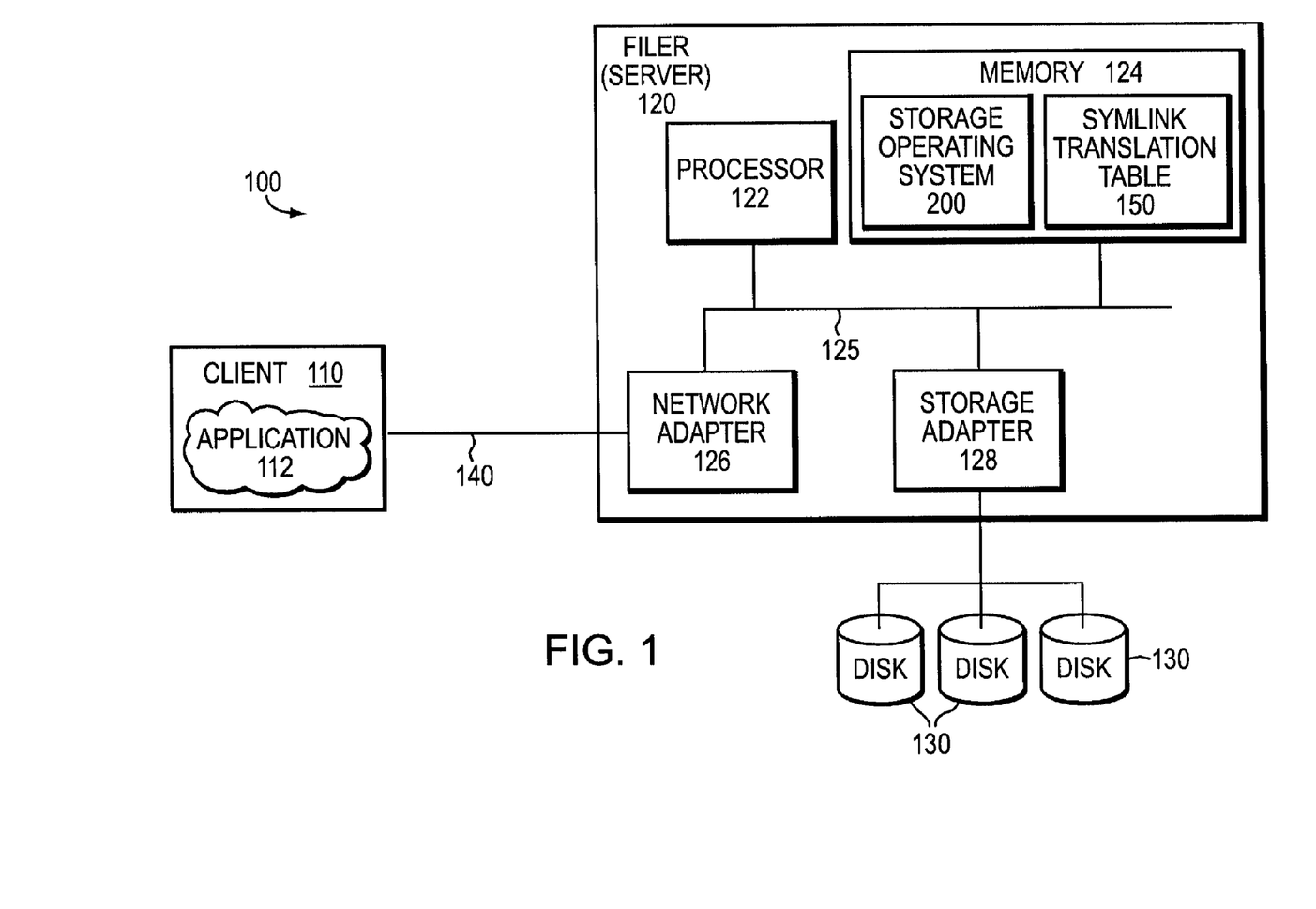
FIG. 1 is a schematic block diagram of a network environment including a server, such as a network storage appliance or filer, which may be advantageously used with the present invention.

FIG. 1 is a schematic block diagram of a network environment 100 including a file server, such as a network storage appliance, that may be advantageously used with the present invention. The file server or filer 120 is a computer that provides file service relating to the organization of information on storage devices, such as disks 130. The filer 120 comprises a processor 122, a memory 124, a network adapter 126 and a storage adapter 128 interconnected by a system bus 125, e.g., a conventional peripheral computer interconnect (PCI) bus 210. The filer 120 also includes a storage operating system 200 that implements a file system to logically organize the information as a hierarchical structure of directories and files on the disks 130 coupled to the storage adapter 128. In the illustrative embodiment described herein, the operating system 200 is preferably the NetApp® Data ONTAP™ operating system available from Network Appliance, Inc. that implements a Write Anywhere File Layout (WAFL) file system.

In the illustrative embodiment, the memory 124 may be organized as storage locations that are addressable by the processor and adapters for storing software program code and data structures associated with the present invention. The processor and adapters may, in turn, comprise processing elements and/or logic circuitry configured to execute the software code and access the data structures. The storage operating system 200, portions of which are typically resident in memory and executed by the processing elements, functionally organizes the filer by, inter alia, invoking storage and network operations in support of the services implemented by the filer. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the filer 120 to a client 110 over a computer network 140, which may comprise a point-to-point connection or a shared medium, such as a local area network. The client 110 may be a general-purpose computer configured to execute applications 112 including file system protocols, such as the Common Internet File System (CIFS) and Network File System (NFS) protocols. Moreover, the client 110 may interact with the filer 120 in accordance with a client/server model of information delivery. That is, the client may request the services of the filer, and the filer may return the results of the services requested by the client, by exchanging packets encapsulating, e.g., the CIFS and NFS protocol formats over the network 140. It will be understood to those skilled in the art that the inventive technique described herein may apply to any server capable of providing a service to any client in accordance with various applications executing on the client communicating with server applications on a server.

The storage adapter 128 cooperates with the storage operating system 200 executing on the filer to access information requested by the client, which information may be stored on storage media, such as the disks 130. The storage adapter includes input/output (I/O) interface circuitry that couples to the disks over an I/O interconnect arrangement, such as a conventional high-performance, Fibre Channel serial link topology. The information is retrieved by the storage adapter and, if necessary, processed by the processor 122 (or the adapter 128 itself) prior to being forwarded over the system bus 125 to the network adapter 126, where the information is formatted into a packet and returned to the client 110.

Storage of information on the filer is preferably implemented as one or more storage "volumes" that comprise a cluster of physical storage disks 130, defining an overall logical arrangement of disk space. Each volume is generally associated with its own file system. To facilitate access to the disks 130, the storage operating system 200 implements a file system that logically organizes the information as a hierarchical structure of directories and files on the disks. Each "on-disk" file may be implemented as set of disk blocks configured to store information, such as data, whereas the directory may be implemented as a specially formatted file in which information about other files and directories are stored. As noted, the storage operating system is preferably the Data ONTAP operating system that implements a WAFL file system. However, it is expressly contemplated that any appropriate file system can be used, and as such, where the term "WAFL" is employed, it should be taken broadly to refer to any file system that is otherwise adaptable to the teachings of this invention.

Figure 2:
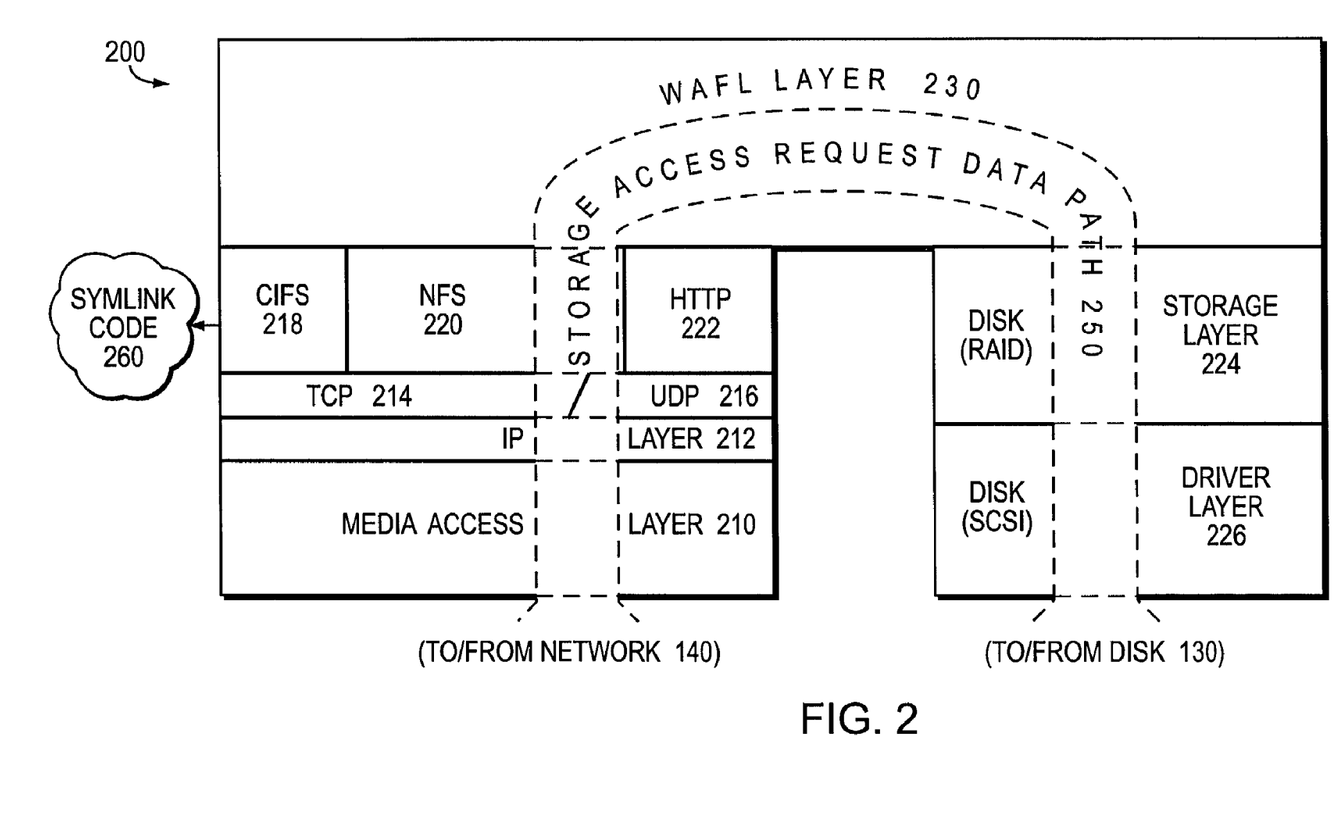
FIG. 2 is a schematic block diagram of a storage operating system that may be advantageously used with the present invention.

FIG. 2 is a schematic block diagram of the Data ONTAP operating system 200 that may be advantageously used with the present invention. The storage operating system comprises a series of software layers, including a media access layer 210 of network drivers (e.g., an Ethernet driver). The operating system further includes network protocol layers, such as the Internet Protocol (IP) layer 212 and its supporting transport mechanisms, the Transport Control Protocol (TCP) layer 214 and the User Datagram Protocol (UDP) layer 216. A file system protocol layer provides multi-protocol data access and, to that end, includes "server" support for the CIFS protocol 218, the NFS protocol 220 and the Hypertext Transfer Protocol (HTTP) protocol 222. In addition, the storage operating system 200 includes a disk storage layer 224 that implements a disk storage protocol, such as a Redundant Array of Independent Disks (RAID) protocol, and a disk driver layer 226 that implements a disk access protocol such as, e.g., a Small Computer Systems Interface (SCSI) protocol.

Bridging the disk software layers with the network and file system protocol layers is a WAFL layer 230 that preferably implements the WAFL file system. The on-disk format representation of the WAFL file system is block-based using, e.g., 4 kilobyte (kB) blocks and using inodes to describe the files. An inode is a data structure, e.g., a 128-byte structure, which is used to store information, such as meta-data, about a file. The meta-data contained in an inode may include, e.g., ownership of the file, access permission for the file, size of the file, file type, unit of storage associated with the file and location of the file on disk. The WAFL file system uses a file handle, i.e., an identifier that includes an inode number, to retrieve an inode from disk. The WAFL layer 230 also uses files to store meta-data describing the layout of its file system. These meta-data files include, among others, an inode file.

Operationally, a request from the client 110 is forwarded as, e.g., a conventional CIFS or NFS protocol packet over the computer network 140 and onto the filer 120 where it is received at the network adapter 126. A network driver of the media access layer 210 processes the packet, passes it onto the network protocol layers 212–216 and CIFS or NFS protocol server layer 218, 220 for additional processing prior to forwarding to the WAFL layer 230. Here, the WAFL file system generates operations to load (retrieve) the requested data from disk 130 if it is not resident "in core", i.e., in the memory 124. If the information is not in memory, the WAFL layer 230 indexes into the inode file using the inode number to access an appropriate entry and retrieve a logical volume block number (VBN). The WAFL layer then passes the logical VBN to the disk storage (RAID) layer 224, which maps that logical number to a disk block number and sends the latter to an appropriate driver (e.g., SCSI) of the disk driver layer 226. The disk driver accesses the disk block number from disk 130 and loads the requested data block(s) in memory 124 for processing by the filer. Upon completion of the request, the filer (and operating system) returns a reply to the client 110 over the network 140.

It should be noted that the software "path" through the storage operating system layers described above needed to perform data storage access for the client request received at the filer may alternatively be implemented in hardware. That is, in an alternate embodiment of the invention, the storage access request data path 250 may be implemented as logic circuitry embodied within a field programmable gate array (FPGA) or an application specific integrated circuit (ASIC). This type of hardware implementation may increase the performance of the file service provided by filer 120 in response to a file system request packet issued by client 110. Moreover, in another alternate embodiment of the invention, the processing elements of adapters 126, 128 may be configured to offload some or all of the packet processing and storage access operations, respectively, from processor 122, to thereby increase the performance of the file service provided by the filer. It is expressly contemplated that the various processes, architectures and procedures described herein can be implemented in hardware, firmware or software.

As used herein, the term "storage operating system" generally refers to the computer-executable code operable to perform a storage function in a storage system, e.g., that implements file system semantics and manages data access. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with storage applications described herein or with configurable functionality, which is configured for storage applications as described herein.

In addition, it will be understood to those skilled in the art that the inventive technique described herein may apply to any type of special-purpose (e.g., file serving appliance) or general-purpose computer, including a standalone computer or portion thereof, embodied as or including a storage system. A server may be defined as a computer adapted to provide application service to one or more clients; in this context, a protocol server is an instance of the application service provided to a client. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

The present invention is generally directed to a technique and mechanism that the enables a storage system, such as a filer, to resolve requests from clients to access resources within a multi-protocol environment. In particular, the present invention provides a technique that enables clients of various protocol environments to access file system resources on a multi-protocol filer by providing an enhanced level of indirection with respect to the locations of the resources. According to the invention, a widelink directive is provided having a level of indirection scope that is "wider" than a conventional symbolic link ("symlink"). The novel widelink directive is similar to a distributed file system (DFS) facility that allows DFS-enabled CIFS clients to resolve uniform naming convention (UNC) paths to locations that may or may not be on an original filer or server.

Broadly stated, assume the filer processes a storage request including a path descriptor from the DFS-enabled CIFS client to access a resource attached to a remotely configured destination, i.e., a destination removed in time, space or relation to the filer. If, in the course of processing the path descriptor, the filer encounters a symlink having the syntax of a widelink structure, an error message is returned to the client, which then requests a DFS referral. In response to the referral request, the filer returns the correct path to the resource attached to the destination that, as described herein, is included within a widelink entry of a conventional symlink.translation file. That correct path could refer to any server capable of handling CIFS clients. The client may then establish a connection over the correct path to the other server or filer in order to access the resource.

In the illustrative embodiment, the widelink structure is stored as a new type of entry in the symlink.translation file located in the /etc/ directory of a file system on the filer. The "in core" representation of the symlink.translations file is preferably manifested as a data structure, such as a table 150, having a plurality of entries. An administrator configures and maintains the symlink.translation table 150, including the novel widelink entry, which typically corresponds to a mount point (i.e., the path where an NFS file system is grafted onto an NFS client's file system). The widelink entry has the following multiple-part format:

widelink /foo/bar2/* \\filer2\share x\* wherein a first part of the widelink entry (e.g., /foo/bar2/*) is a source string denoting a first path descriptor to a resource, such as a unit of storage, and a second part of the entry (\\filer2\share x\*) is a replacement string denoting a second, correct path descriptor to that unit of storage. According to the invention, the first part of the widelink entry is compared with the content of a widelink directive, e.g., an original path descriptor. If a match is found, the content of the directive is substituted with the second part of the widelink entry to thereby enable access to the requested unit of storage.

The novel widelink directive leverages the ability of Windows clients to redirect requests to access resources of the filer based on a DFS implementation of those clients using Unix symlink directives that are undefined in a Windows environment. As with the DFS facility, the widelink directive is quite flexible in that it can be used to resolve symlinks that "leave" a share. The present invention thus makes it possible for a Windows (NT) client to make use of a symlink, particularly in the case of a multi-protocol storage system having a file system adapted to implement conventional NFS mount operations. Here, the layout of the file system is a function of, among other things, the manner in which the disks are mounted. Notably, the Windows client generally has no knowledge of how the storage resources are mounted on the system.

Figure 3:
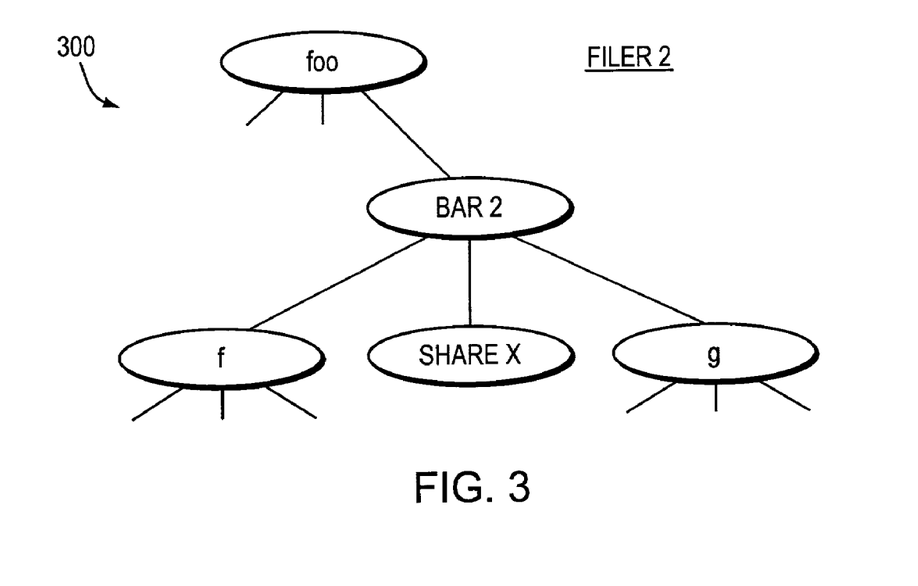
FIG. 3 is a schematic block diagram of the organization of an embodiment of a file system that may be advantageously used with a novel widelink directive of the present invention.

FIG. 3 is a schematic block diagram of the organization of an embodiment of a file system 300, such as the WAFL file system implemented by the WAFL layer 230, which may be advantageously used with the widelink directive of the present invention. The file system is illustratively embodied on a multi-protocol server (e.g., filer2), and is organized as a hierarchy of directories (e.g., /foo) and subdirectories (e.g., /bar2). A directory structure is then mounted "on top of" the directory /bar2, where the structure includes a plurality of files (e.g., share x) and a plurality of subdirectories (e.g., /f, /g).

Figure 4:
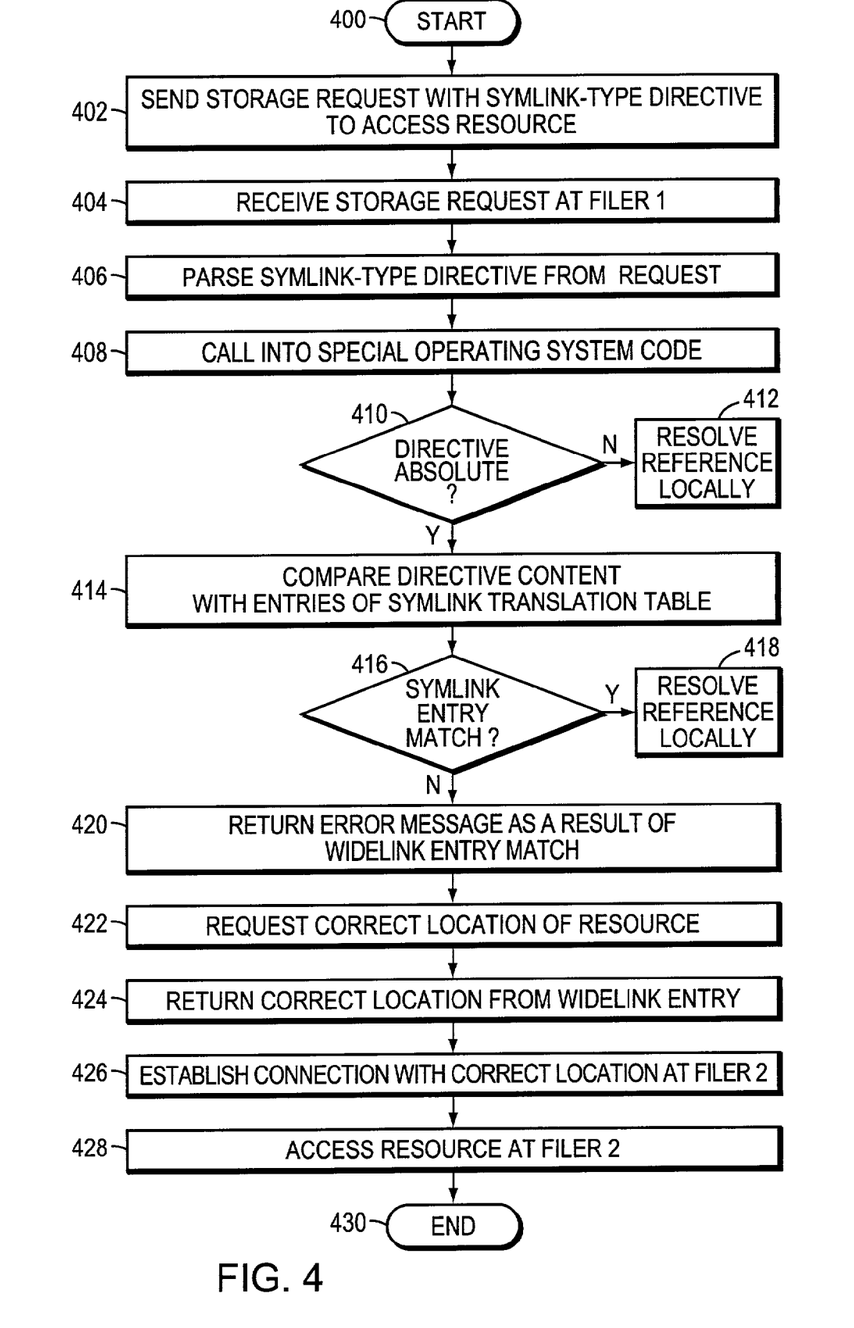
FIG. 4 is a flowchart illustrating the sequence of steps involved when resolving a request to access a resource using the novel widelink structure according to the present invention.

FIG. 4 is a flowchart illustrating the sequence of steps involved when resolving a request to access a resource, such as a unit of storage, using the novel widelink directive. The sequence starts at Step 400 and proceeds to Step 402 where a Windows client generates and sends a storage request, such as a CIFS request, that includes a symlink-type directive, i.e., a widelink directive, to a first filer 120, e.g., filer1, wherein the widelink directive is defined as an original path descriptor /fo/bar2 to a resource, such as a CIFS share. Note that a conventional network session "connection" is established between the client and first filer in accordance with a conventional connection-oriented service provided by, inter alia, the TCP layer 214. The request is received at filer1 at Step 404 and is forwarded to the CIFS layer 218 of the storage operating system 200, where resolution of a storage request path begins.

At Step 406, the CIFS layer 218 parses the symlink-type (widelink) component from the specified path and, at Step 408, calls into special operating system code 260 configured to handle indirection links, such as symlinks and widelinks. At Step 410, the special "symlink" code 260 determines whether the symlink-type component is "absolute", e.g., starts with a slash (/) or is otherwise identified as a symlink that may resolve to a widelink, such as starting with (~/). Note that an "absolute symlink" refers to a symbolic link with a destination that does not begin relative to the directory in which the symlink is found. If it is not, the directive reference is relative to the current directory and resolution is handled locally, e.g., within the current file system or volume (Step 412). If the symlink-type component is absolute, then the symlink.translation table 150 is accessed and, at Step 414, the content of the symlink-type component is compared with the entries of that table to select a matching entry.

If the matching entry is a conventional symlink mapping entry (Step 416), then the reference is also handled locally at Step 418 (and that reference cannot leave the share). However, if the matching entry is not a symlink entry, it is a novel widelink entry and an error status is returned to the Windows client at Step 420. Specifically, if the storage request path descriptor matches the first part of a widelink directive entry, the code 260 returns a "path_not_covered" error status (e.g., 0xC0000257) to the client. The client then requests the correct location of that resource at Step 422 and, at Step 424, the symlink code returns the second part of the widelink entry to the client, which indicates that correct location.

According to the invention, the widelink directive instructs the filer1 to substitute another path descriptor, such as a UNC path, for the requested path to thereby enable the client to directly refer to the requested unit of storage. The UNC path includes a server name (e.g., \\filer2) and share name (e.g., \share x). Therefore, filer1 substitutes the UNC path (\\filer2\share x) for a portion of the requested path (/foo/bar2). At Step 426, the client establishes another conventional network connection (session) over the correct path to the different filer2. If the shares are configured correctly, such that share x refers (points) to the same location at which /bar2 is mounted, then the Windows client can correctly access its CIFS share resource on filer2 (Step 428). The sequence then ends at Step 430.

The novel widelink directive thus solves the problem of being able to follow a symlink-type directive created by a Unix user and referenced by a Windows client, even if the link extends beyond (goes out of) a share and onto another server. It should be noted that the widelink directive may also be used for a resource that is on the same storage system (filer) but in a different share. Moreover, the inventive widelink directive can be used in connection with a conventional symlink directive to provide an enhanced level of indirection when resolving a request to access to a resource.

For example, assume the symlink.translations table is configured with the following symlink mapping entry and novel widelink entry:

widelink /projects/* \\server1\rproj\*
\\filer\share\dir1\proj-a links to /projects/teams/ateam A Windows client issues a CIFS request to the filer with a path descriptor \\filer\share\dir1\proj-a\dirx\sept8.dat. The filer resolves the path using the path resolution process described above until the proj-a path component is found to be a widelink directive. An error status, path_not_covered, is then returned to the client; the error status triggers the client to issue a get_DFS_referral CIFS request to get a DFS referral. Note that the DFS referral only works for clients that support DFS; this is known based on initial session negotiation.

In response to the DFS referral request, the filer substitutes the latter portion of the widelink entry into the path to generate a \server1\rproj\teams\ateam\dirx\sept8.dat value. In particular, the \projects\ portion is mapped in the symlink.translations table 150 to \\server1\rproj, the rest of the proj-a symlink is translated into teams\ateam, and the rest of the original path is left unaltered. The DFS referral is then returned to the client.

The client may then start a new session (or use an existing session) with server server1 and connect to the rproj share. This share must be configured the same as the NFS client mounts, so that they both refer to the same directory structures. Assuming that this has been done, the client continues the access by handing the share-relative path teams\ateam\dirx\sept8.dat to the server1. As with any path resolved via DFS, once the client has resolved the path it does not have to reconnect to the original filer until, e.g., a time-to-live parameter expires.

Advantageously, the inventive widelink directive provides full share-level security that is enforced since the client establishes a new connection (session) to the destination share. Once a path has been resolved the client connects directly to the server with the resource. In the case of CIFS servers (such as Samba) that support this function using NFS mounts, every request to access a resource impacts both an original server and the storage server, as well as generating additional NFS network traffic between the servers. Moreover, the destination can be any CIFS share including another filer, or Windows server. In addition, the destination may be a DFS root on a Windows server, which then provides a further level of indirection if desired.

While there has been shown and described illustrative embodiments of a widelink directive in a storage system, such as a multi-protocol filer, it is to be understood that various other adaptations and modifications may be made within the spirit and scope of the invention. For example, in the WAFL file system, a special directory called a "qtree" may be created that has the properties of a logical sub-volume within the namespace of a physical volume. Each file system object (file or directory) is associated with one and only one qtree and quotas, security properties and other items can be assigned on a per-qtree basis. Each volume has its own file system identifier and each qtree within a volume has its own qtree identifier (qtreeid).

Figure 5:
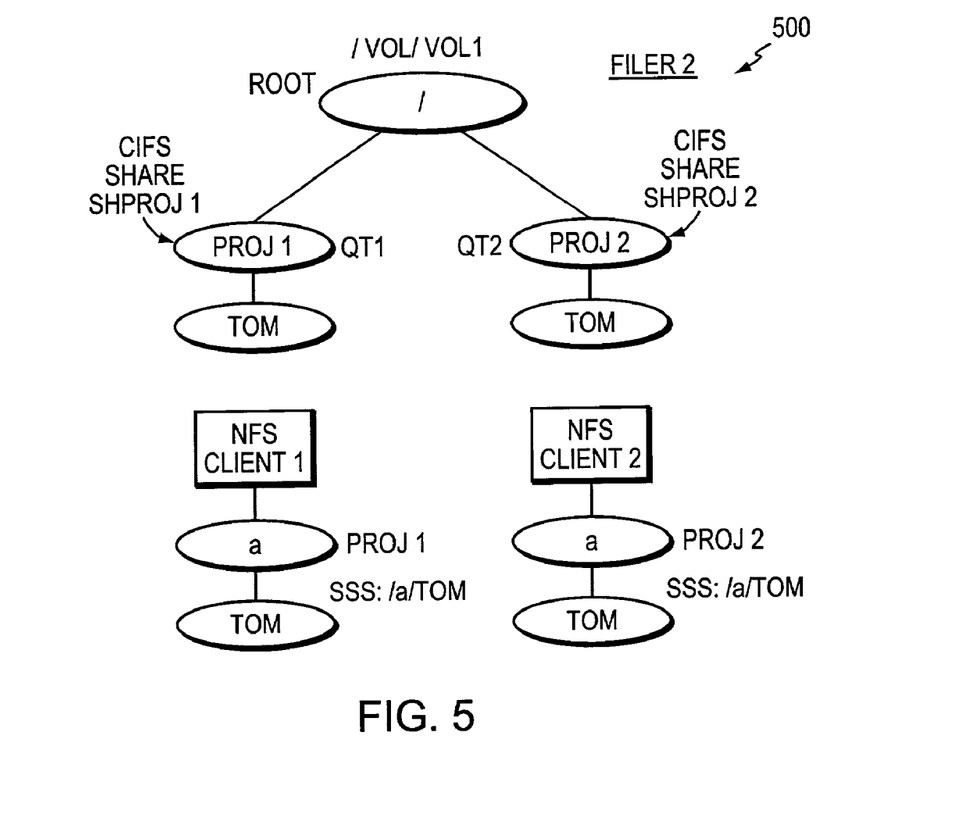
FIG. 5 is a schematic block diagram of the organization of an alternate embodiment of a file system that may be advantageously used with the novel widelink directive of the present invention.

FIG. 5 is a schematic block diagram of the organization of an alternate embodiment of a file system 500 that may be advantageously used with the novel widelink directive. The file system is illustratively embodied on a multi-protocol server (e.g., filer2), and is organized as a conventional NFS file system having hierarchy of directories starting from a root directory (/) labeled /vol/vol0. The root directory includes two qtrees qt1, qt2 labeled proj1, proj2, respectively, with each qtree having a directory Tom contained therein.

In general, a Unix client can mount a directory anywhere in the NFS file system. Therefore, a first Unix client computer (NFS client1) mounts a directory Tom of proj1 in directory a of its file system. In addition, a second Unix client (NFS client2) mounts a directory Tom of proj2 in its directory a of its file system. Assume a symlink sss: /a/Tom is created for the path to directory Tom. Any user logged into the NFS client1 computer that encounters the symlink sss: /a/Tom will eventually access the directory Tom within the directory proj1 (when the symlink is resolved). Similarly, a user logged into NFS client2 that encounters the symlink sss: /a/Tom will access the directory Tom within the directory proj2 (when that symlink is resolved). Although it is possible for two directories/files to map to the same path descriptor of a symlink, two qtrees would not map to the same path. Accordingly, the mapping function of the symlink.translation table can be qualified by qtree to ensure unique identification of a storage resource.

Assume a CIFS share shproj1 references (points to) directory proj1 and CIFS share shproj2 points to directory proj2. In accordance with the present invention, widelinks can be created within the symlink.translation table 150 having the following notations:

(1) widelink /a/* @/vol/vol0/qt1 \\filer2\shproj1\*
(2) widelink /a/* @/vol/vol0/qt2 \\filer2\shproj2\* wherein the symbol "@" signifies a third, optional part of the widelink entry format, which is preferably a qtreeid. In the case of widelink entry (1), if a path starts with /a/* and it is on /vol/vol0/qt1, then the widelink directive specifies going to (substituting in) the path \\filer2\shproj1\*. Here, a request from a CIFS client refers to a symbolic link sss: /a/Tom. When this symlink is resolved, the location (qtree) of the symlink is considered. When processing the request, the filer apportions and analyzes each component of the path descriptor within the request. Specifically, the component sss: (i.e., the symlink) is resolved by accessing the appropriate directory entry, loading the appropriate inode in memory and examining its contents, which indicates a referral to a symlink. The qtreeid is then retrieved from the inode and stored locally. The symlink.translation table 150 is thereafter accessed using the contents of the symlink sss: /a/Tom qualified by the qtreeid (qt1). In other words, when searching for a matching entry within the symlink.translation table 150, not only is a portion of the path within the request compared with each entry, but also the qtreeid (including the path /vol/vol0) is compared to find a matching entry.

On the other hand, when a NFS (Unix) client issues a request having a path /a/Tom, that path is literally resolved to the correct storage by traversing the path /a/Tom. Note that Unix clients follow symlinks by decomposing the path (e.g., /a/Tom) specified by the symlink using conventional Unix path-following procedures. However, for Windows (NT) clients, the symlink is resolved using the symlink.translation mapping function qualified, according to the aspect of the present invention, by qtree. Therefore, both Unix (NFS) and Windows (CIFS) clients can use the same "string" form of the symlink to access the correct unit of storage. Resolution of a symlink (widelink) qualified by qtree is optional; that is, if no qtree is specified as a matching criterion then whatever qtree the specified path is in results in a matching entry.

In yet another alternate embodiment of the invention, the novel widelink directive may be advantageously used in accordance with a filer implementing a virtual filer (vfiler) architecture and, in particular, with a multi-protocol implementation of a vfiler. The vfiler architecture is disclosed in U.S. patent application Ser. No. 10/035,664 titled, Architecture for Creating and Maintaining Virtual Filers on a Filer, which is hereby incorporated by reference as though fully set forth herein.

Broadly stated, a vfiler is a logical partitioning of network and storage resources of the filer platform to establish an instance of a multi-protocol server. Each vfiler is maintained and executed entirely independent of other vfilers on the platform. Dedicated filer resources, such as units of storage and network addresses of network interfaces, may be grouped and hard partitioned to establish security domains within the filer. Yet common filer resources, such as a storage operating system and a file system, may be shared among the vfilers. For this embodiment of the invention, the symlink.translation file is located in the /etc/ directory of each vfiler embodied within the filer.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for providing an enhanced level of indirection with respect to a resource attached to a destination, the method comprising the steps of:
   comparing a content of a widelink directive with first parts of widelink entries stored in a translation table of a first storage system, the widelink directive generated and sent by a client to the first storage system within a first request to access the resource;
   substituting the content of the widelink directive with a second part of a matching widelink entry indicating a correct path to the destination; and
   establishing a connection from the client to the destination over the correct path to thereby provide the enhanced level of direction that enables access by the client to the requested resource.

2. The method of claim 1 further comprising the steps of, prior to the step of substituting:
   returning an error status to the client; and
   in response to the error status, sending a second request from the client to the first storage system for a referral to a correct location of the resource.

3. The method of claim 2 wherein the referral is a distributed file system (DFS) referral.

4. The method of claim 3 wherein the client is a DFS-enabled common internet file system (CIFS) client.

5. The method of claim 4 wherein the first storage system is a first filer.

6. The method of claim 5 wherein the destination is a CIFS share including one of a second filer, a second storage system and a Windows server.

7. A memory of a first storage system containing data structures comprising:
   a widelink directive generated by a first computer and sent to the first storage system for storage in the memory, the widelink directive having a content defined as an original path descriptor to a resource; and
   a widelink entry structure adapted for storage in a symlink.translation table of the memory, the widelink entry structure having a multiple-part format, wherein a first part of the widelink entry is compared with the content of the widelink directive and, if a match is found, the content of the directive is substituted with a second part of the widelink to enable access to the resource on a second storage system.

8. The memory of claim 7 wherein the first storage system is a first virtual filer (vfiler) of a filer and the second storage system is a second vfiler of the filer.

9. The memory of claim 7 wherein the first storage system is a first protocol server of a multi-protocol filer and second storage system is a second protocol server of the multi-protocol filer.

10. The memory of claim 9 wherein the resource is a unit of storage.

11. The memory of claim 10 wherein the first computer is a common internet file system (CIFS) client computer and wherein the unit of storage is a CIFS share.

12. The memory of claim 7 wherein the first storage system is a first filer and wherein the second storage system is a second filer.

13. The memory of claim 12 wherein the resource is a unit of storage.

14. The memory of claim 13 wherein the first computer is a common internet file system (CIFS) client computer and wherein the unit of storage is a CIFS share.

15. The memory of claim 7 wherein the multiple-part format of the widelink entry structure includes a third, optional part that ensures unique identification of the resource.

16. The memory of claim 15 wherein the third optional part comprises an @ symbol signifying a qtree identifier.

17. A filer adapted to provide an enhanced level of indirection with respect to a resource attached to a remotely configured destination, the filer comprising:
   a memory organized as storage locations to store data structures, including a translation table having a plurality of entries;
   an operating system resident in the memory, the operating system including special code configured to access the translation table in response to a widelink directive to compare a content of the widelink directive with the entries of the table, the special code further configured to provide a correct path to the resource attached to the remotely configured destination in response to the content of the widelink directive matching a widelink entry of the translation table.

18. The filer of claim 17 further comprising a processing element configured to execute the operating system to thereby invoke network and storage access operations in response to processing of the widelink directive and the matching widelink entry.

19. The filer of claim 18 wherein the remotely configured destination is a common internet file system (CIFS) share including one of a second filer, a multi-protocol storage system and a Windows server.

20. Apparatus for providing an enhanced level of indirection with respect to a resource attached to a destination, the apparatus comprising:
   means for comparing a content of a widelink directive with first parts of widelink entries stored in a translation table of a storage system, the widelink directive generated and sent by a client to the storage system within a first request to access the resource;
   if a match is found, means for returning an error message to the client;
   in response to the error message, means for sending a second request from the client to the storage system for a referral to a correct location of the resource;
   in response to the second referral request, means for substituting the content of the widelink directive with a second part of the matching widelink entry indicating a correct path to the destination; and
   means for establishing a connection from the client to the destination over the correct path to thereby provide the enhanced level of direction that enables access by the client to the requested resource.

21. The apparatus of claim 20 wherein the destination is remotely configured with respect to the storage system.

22. The apparatus of claim 21 wherein the remotely configured destination is a common internet file system (CIFS) share including one of a multi-protocol filer, another storage system and a Windows server.

23. A computer readable medium containing executable program instructions for providing an enhanced level of indirection with respect to a resource attached to a destination, the executable program instructions comprising program instructions for:

comparing a content of a widelink directive with first parts of widelink entries stored in a translation table of a storage system, the widelink directive generated and sent by a client to the storage system within a first request to access the resource;

if a match is found, returning an error message to the client;

in response to the error message, sending a second request from the client to the storage system for a referral to a correct location of the resource;

in response to the second referral request, substituting the content of the widelink directive with a second part of the matching widelink entry indicating a correct path to the destination; and establishing a connection from the client to the destination over the correct path to thereby provide the enhanced level of direction that enables access by the client to the requested resource.

24. The computer readable medium of claim 23 wherein the destination is remotely configured with respect to the storage system.

25. The computer readable medium of claim 24 wherein the remotely configured destination is a common internet file system (CIFS) share including one of a multi-protocol filer, another storage system and a Windows server.

* * * * *